United States Patent
Taoki

(10) Patent No.: US 10,643,315 B2
(45) Date of Patent: May 5, 2020

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Shinya Taoki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 20 days.

(21) Appl. No.: 15/994,861

(22) Filed: May 31, 2018

(65) Prior Publication Data

US 2018/0374200 A1 Dec. 27, 2018

(30) Foreign Application Priority Data

Jun. 21, 2017 (JP) ................. 2017-121162

(51) Int. Cl.
```
G06T 5/00      (2006.01)
G06T 3/00      (2006.01)
H04N 5/232     (2006.01)
H04N 7/18      (2006.01)
G06T 7/73      (2017.01)
```

(52) U.S. Cl.
CPC ............ *G06T 5/006* (2013.01); *G06T 3/0043* (2013.01); *G06T 3/0062* (2013.01); *G06T 7/73* (2017.01); *H04N 5/23216* (2013.01); *H04N 5/23238* (2013.01); *H04N 5/232061* (2018.08); *H04N 5/232933* (2018.08); *H04N 5/232945* (2018.08); *H04N 7/183* (2013.01)

(58) Field of Classification Search
CPC ....... H04N 5/232061; H04N 5/232933; H04N 5/232945; H04N 5/23216; H04N 7/183; H04N 5/23238; G06T 5/006; G06T 3/0043; G06T 7/73; G06T 3/0062
See application file for complete search history.

(56) References Cited

U.S. PATENT DOCUMENTS

| | | | |
|---|---|---|---|
| 9,251,559 B2* | 2/2016 | Kuwada | H04N 7/183 |
| 9,412,149 B2* | 8/2016 | Suzuki | H04N 5/23238 |
| 9,565,362 B2* | 2/2017 | Kudo | H04N 5/2171 |
| 9,858,643 B2* | 1/2018 | Nishimaki | G06T 3/40 |
| 9,865,092 B2* | 1/2018 | Dunn | G06T 19/006 |
| 9,973,691 B2* | 5/2018 | Kato | G06T 3/4038 |
| 9,973,711 B2* | 5/2018 | Yang | G06T 3/40 |
| 10,026,207 B2* | 7/2018 | Nakakusu | G06T 11/60 |
| 2010/0119172 A1 | 5/2010 | Yu | |

(Continued)

FOREIGN PATENT DOCUMENTS

JP 2005-192057 A 7/2005

OTHER PUBLICATIONS

Philip Decamp, et al., An Immersive System for Browsing and Visualizing Surveillance Video, MM 10, Oct. 25-29, 2010, Firenze, Italy. Copyright 2010 ACM 978-160558-933-6/10/10, pp. 371-380.

*Primary Examiner* — Philip P. Dang
(74) *Attorney, Agent, or Firm* — Canon U.S.A., Inc. IP Division

(57) ABSTRACT

A position determination unit determines, in a fisheye image, a position of a clipping portion clipped from the fisheye image. Based on the position of the clipping portion determined by the position determination unit, a determination unit determines a moving amount of the clipping portion for moving the clipping portion.

17 Claims, 14 Drawing Sheets

(56) References Cited

U.S. PATENT DOCUMENTS

| | | | |
|---|---|---|---|
| 2011/0019239 A1* | 1/2011 | Kojima | G06F 3/0488 |
| | | | 358/401 |
| 2012/0062695 A1 | 3/2012 | Sakaki | |
| 2013/0081028 A1* | 3/2013 | Levien | G06F 9/5027 |
| | | | 718/102 |
| 2013/0222646 A1 | 8/2013 | Tsubota | |
| 2015/0049220 A1 | 2/2015 | Kuwata | |
| 2017/0076477 A1 | 3/2017 | Nakakusu | |
| 2017/0278263 A1* | 9/2017 | Tanaka | H04N 5/23206 |

* cited by examiner

INFORMATION PROCESSING APPARATUS, INFORMATION PROCESSING METHOD, AND RECORDING MEDIUM

BACKGROUND OF THE INVENTION

Field of the Invention

The present invention relates to an information processing apparatus, an information processing method, and a recording medium.

Description of the Related Art

An omnidirectional camera mounting an omnidirectional mirror, an all-around fish-eye lens, etc. is an imaging apparatus for capturing an all-around scene. Potential applications of an omnidirectional camera include the use as a surveillance camera and robot navigation. An omnidirectional camera is capable of capturing a fisheye image having a 360-degree circumferential or circular shape. There is an image clipping function for clipping an image at a specific position in a fisheye image captured by an omnidirectional camera, adjusting distortion and inclination of the fisheye image, and converting the clipped image into a most suitable angle for display (this function is referred to as dewarp).

Japanese Patent Application Laid-Open No. 2005-192057 discusses an intuitive user-friendly image display method and image display apparatus which allow an observer to view partial and enlarged images in a desired direction based on a space image captured by an omnidirectional camera.

Conventionally, in a case where adjusting the position of a clipping portion in a fisheye image by using cross keys as a graphical user interface (GUI) or through a protocol-based direction specification, the clipping portion in the fisheye image is moved by a fixed amount on the fisheye image regardless of the position of the clipping portion in the fisheye image. FIG. 1A illustrates an example of a fisheye image, more specifically, a fisheye image 10000 including three different persons. FIG. 1B illustrates an example moving state of clipping portions. The fisheye image 10000 includes clipping portions 10001 and 10002. Referring to FIG. 1B, the clipping portions 10001 and 10002 are moved by the same moving amount in the right above direction in the fisheye image 10000.

The clipping portion 10002 near the center 10003 of the fisheye image 10000 mainly includes the lower body of a first person before the movement, and mainly includes the face of the first person after the movement. By contrast, the clipping portion 10001 away from the center 10003 of the fisheye image 10000 changes in a different way. Before the movement, the upper portion of the clipping portion 10001 partly includes the lower body of a second person. After the movement, the lower portion of the chipping portion 10001 includes a part of the face of the second person, and the upper portion (the portion upper than the vicinity of the center 10003) of the clipping portion 10001 includes a third person behind the second person. This means that the clipping portion 10001 changes more largely than the clipping portion 10002 does. In this way, if the clipping portions 10001 and 10002 move by a fixed moving amount in a specified direction on the fisheye image 10000 wherever the clipping portions 10001 and 10002 exist in the fisheye image 10000, the image clipping portion 10001 existing on a peripheral side includes a distant object which looks comparatively small, compared with the clipping portion 10002 existing near the center 10003 of the fisheye image 10000.

Thus, fine tuning of clipping portion 10001 is more difficult than for clipping portion 10002 because of the moving amount for clipping portion 10001 being larger than the moving amount for clipping portion 10002.

There has been a demand for determining a more suitable moving amount of a clipping portion in a fisheye image.

SUMMARY OF THE INVENTION

According to an aspect of the present invention, an information processing apparatus includes a position determination unit configured to determine, in a fisheye image, a position of a clipping portion clipped from the fisheye image, and a determination unit configured to, based on the position of the clipping portion determined by the position determination unit, determine a moving amount of the clipping portion for moving the clipping portion.

Further features of the present invention will become apparent from the following description of exemplary embodiments with reference to the attached drawings.

DESCRIPTION OF THE EMBODIMENTS

Exemplary embodiments of the present invention will be described in detail below with reference to the accompanying drawings.

Figure 1A:
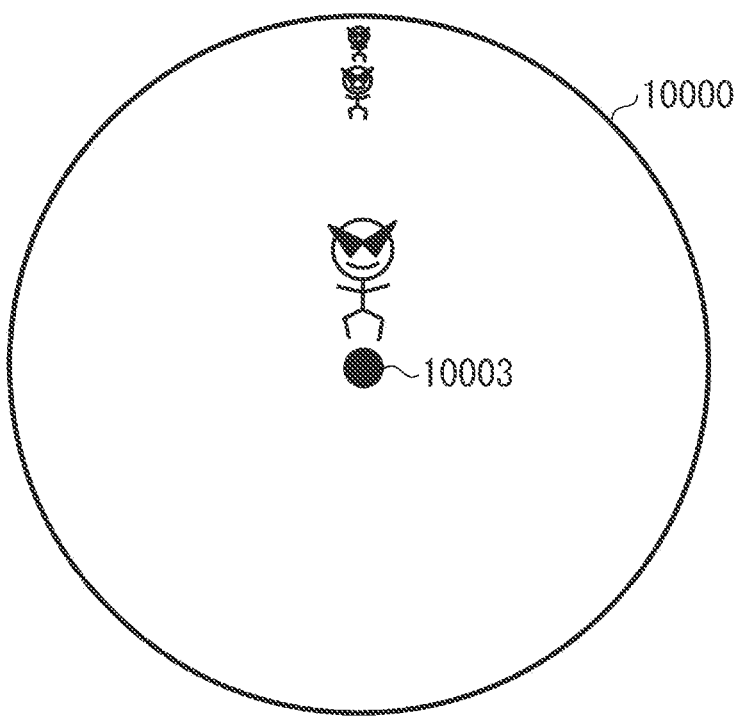
FIGS. 1A and 1B illustrate an example of a fisheye image.
Figure 1B:
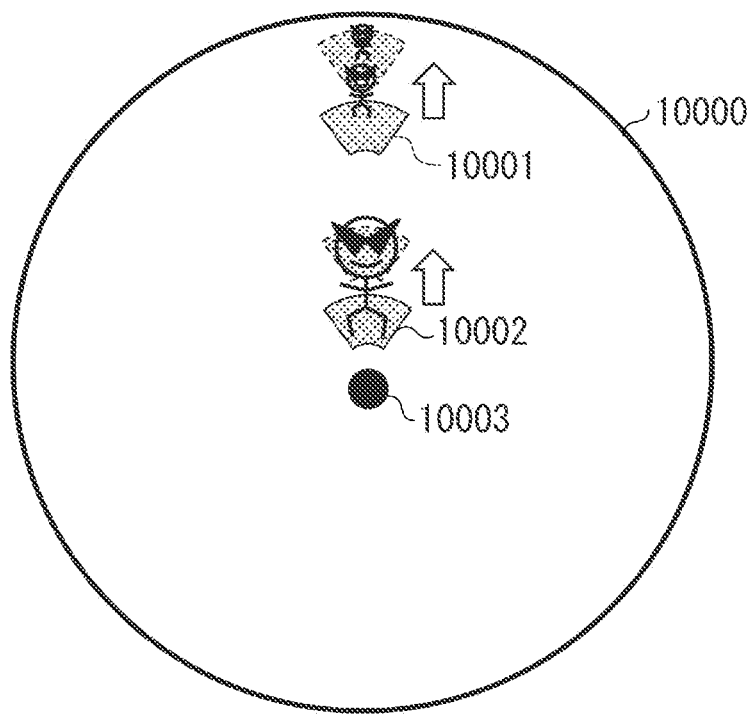
Figure 2A:
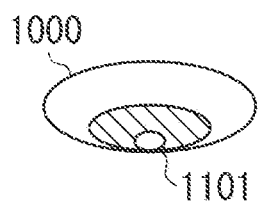
FIGS. 2A and 2B illustrate an example system configuration of an information processing system.

A first exemplary embodiment will be described in detail below. FIG. 2A illustrates an overview of an example of an imaging apparatus 1000. The imaging apparatus 1000 including an omnidirectional mirror and an all-around fish-eye lens is an imaging apparatus for capturing a fisheye image, such as a surveillance camera or a network camera. The imaging apparatus 1000 is an example of an information processing apparatus. The use of an all-around fish-eye lens is considered to be an example, and each exemplary embodiment is applicable to a technique for capturing an image by using a lens in which a possibly visible distortion occurs. In each exemplary embodiment, fisheye images include an image captured by using a lens in which a possibly visible distortion occurs.

A housing 1101 of the imaging apparatus 1000 includes an omnidirectional mirror and an all-around fish-eye lens. The imaging apparatus 1000 captures an all-around scene, i.e., a fisheye image having a 360-degree circumferential or circular shape. The imaging apparatus 1000 is installed with one of three different installation methods: ceiling installation, desktop installation, and wall attachment installation. The imaging apparatus 1000 as an omnidirectional camera has a mode related to installation. The imaging apparatus 1000 is provided with a ceiling installation/desktop installation mode in which the apparatus is installed on the ceiling or desk, aiming for monitoring a wide range of a room, and a wall attachment mode in which the apparatus is installed on a wall, aiming for monitoring a place with a good view. The imaging apparatus 1000 is also provided with a general-purpose mode in which the apparatus is installed without limitations of installation conditions.

Figure 2B:
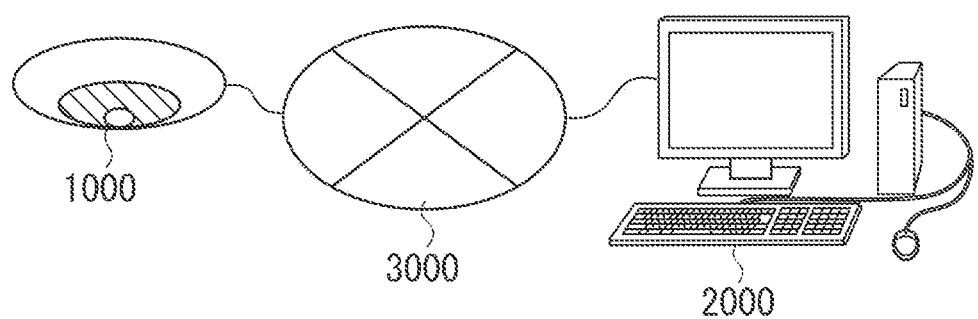

FIG. 2B illustrates an example of a system configuration of an information processing system according to the present exemplary embodiment. The information processing system includes the imaging apparatus 1000 and a client apparatus 2000. The imaging apparatus 1000 and the client apparatus 2000 are connected so that they can communicate with each other via a network 3000. The client apparatus 2000 is an information processing apparatus, such as a personal computer (PC), server apparatus, and tablet apparatus which transmits various commands including white balance adjustment to the imaging apparatus 1000. The imaging apparatus 1000 transmits to the client apparatus 2000 a response for a command received from the client apparatus 2000.

Figure 3A:
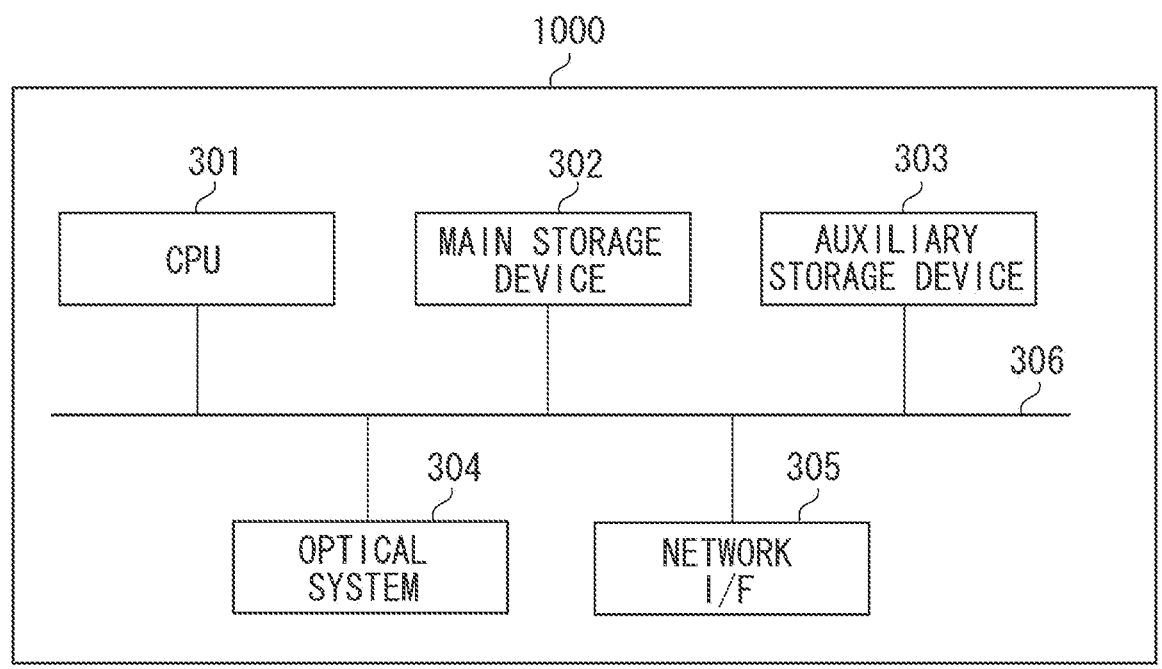
FIGS. 3A and 3B illustrate example hardware configurations of an imaging apparatus and a client apparatus.

FIG. 3A illustrates an example of a hardware configuration of the imaging apparatus 1000. The imaging apparatus 1000 includes a central processing unit (CPU) 301, a main storage device 302, an auxiliary storage device 303, an optical system 304, and a network interface (I/F) 305. Each element is mutually and communicably connected through a system bus 306.

The CPU 301 is a central processing unit which controls the imaging apparatus 1000. The main storage device 302 is, for example, a random access memory (RAM) which functions as a work area of the CPU 301 and a temporary data storage location. An auxiliary storage device 303 stores various programs, various setting information, captured fisheye images, and various commands. The auxiliary storage device 303 is a storage medium, such as a read only memory (ROM), hard disk drive (HDD), and solid state drive (SSD).

The optical system 304 includes an omnidirectional mirror, an all-around fish-eye lens, an image sensor, and a lens drive motor, and captures the surrounding environment. The network I/F 305 is used for communication with an external apparatus, such as the client apparatus 2000 via the network 3000.

The functions of the imaging apparatus 1000 described below with reference to FIGS. 4A and 4B and processing of flowcharts described below with reference to FIGS. 6, 12, 13, and 14 are implemented by the CPU 301 performing processing based on a program stored in the auxiliary storage device 303.

Figure 3B:
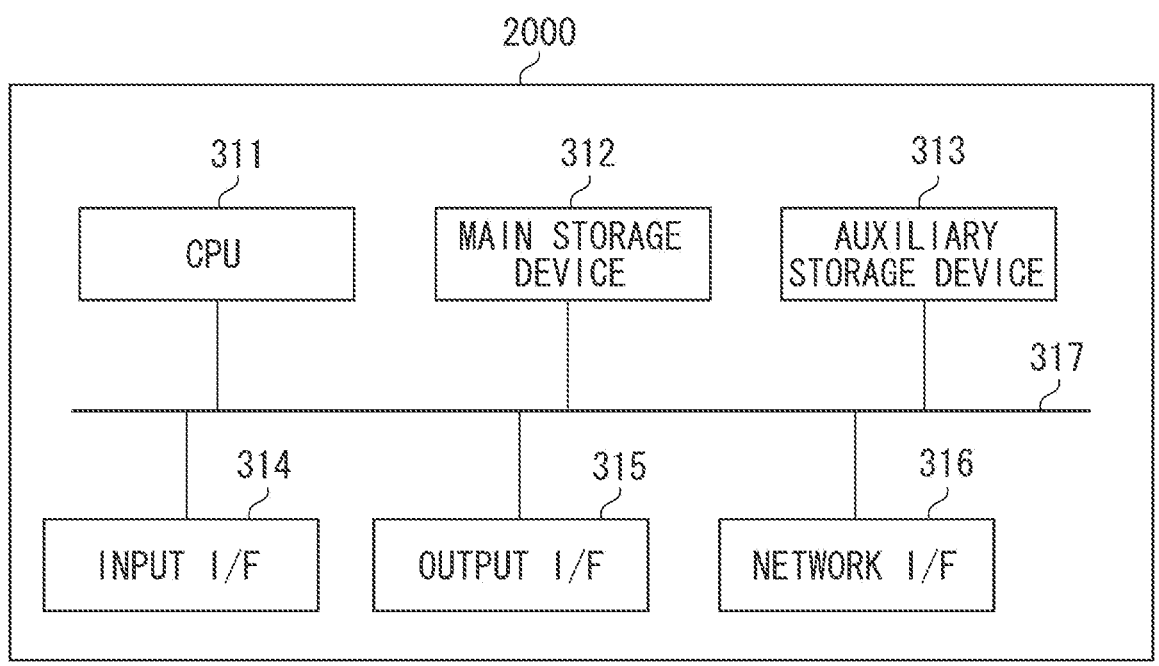

FIG. 3B illustrates an example of a hardware configuration of the client apparatus 2000. The client apparatus 2000 includes a CPU 311, a main storage device 312, an auxiliary storage device 313, an input I/F 314, an output I/F 315, and a network I/F 316. Each element is connected so that they can communicate with each other via a system bus 317.

The CPU 311 is a central processing unit which controls the client apparatus 2000. The main storage device 312 is, for example, a RAM which functions as a work area of the CPU 311 and a temporary data storage location. The auxiliary storage device 313 stores various programs, such as control applications for controlling the imaging apparatus 1000, various setting information, captured fisheye images, and various commands. The auxiliary storage device 313 is a storage medium, such as a ROM, HDD, and SSD.

The input I/F 314 is used for connection with input apparatuses, such a mouse, keyboard, and touch panel operation unit, and receives information input from the input apparatuses. The output I/F 315 is used for connection with output apparatuses, such as a liquid crystal display (LCD), speaker, and touch panel, and outputs information to the output apparatuses. The network I/F 316 is used for communication with an external apparatus, such as the imaging apparatus 1000 via the network 3000.

Figure 4A:
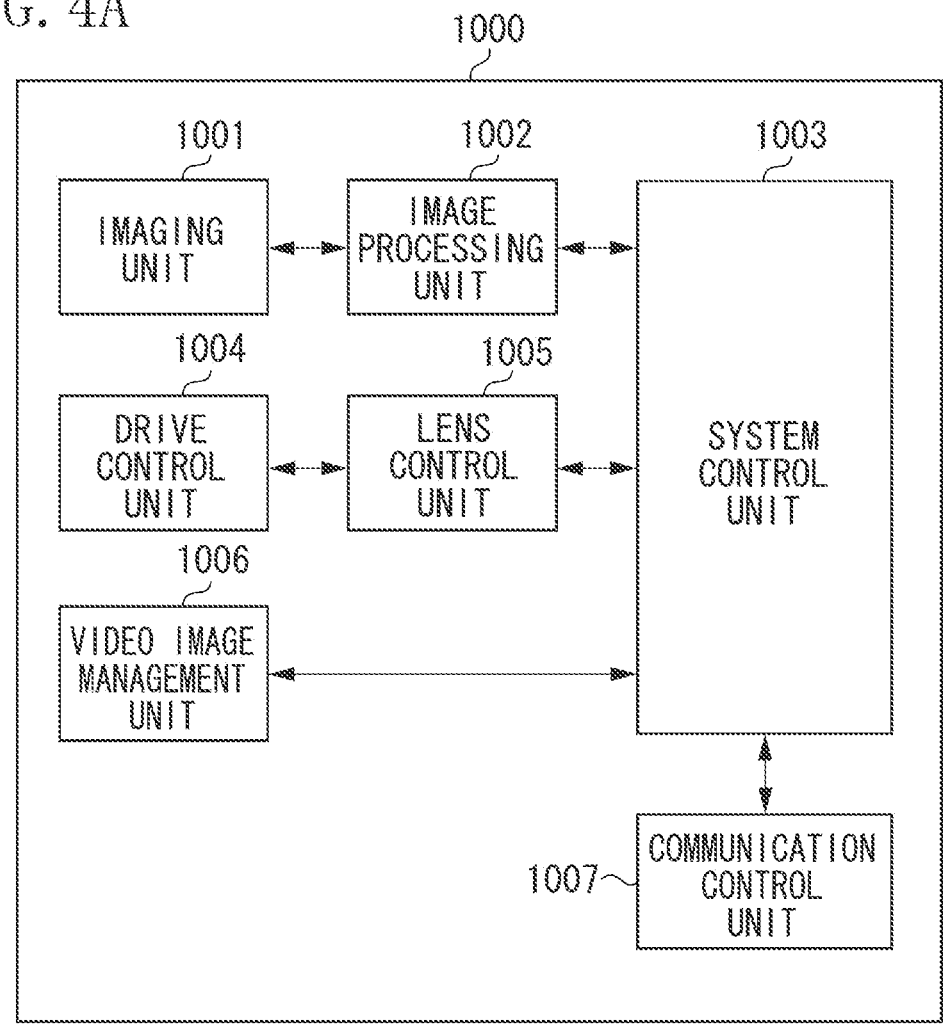
FIGS. 4A and 4B illustrates example functional configurations of the imaging apparatus and the client apparatus.
Figure 4B:
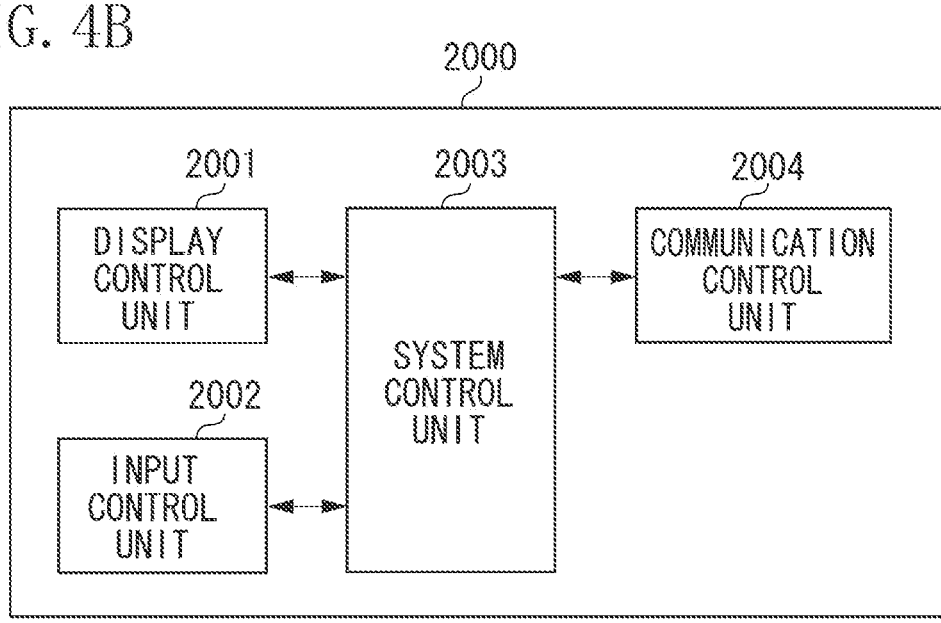

When the CPU 311 performs processing based on a program stored in the auxiliary storage device 313, functions and processing of the client apparatus 2000 described below with reference to FIGS. 4A and 4B are implemented.

FIG. 4A illustrates an example of a functional configuration of the imaging apparatus 1000. The imaging apparatus 1000 includes an imaging unit 1001, an image processing unit 1002, a system control unit 1003, a drive control unit 1004, a lens control unit 1005, a video image management unit 1006, and a communication control unit 1007.

The imaging unit 1001 acquires an electrical signal converted from incident light entering the image sensor of the optical system 304 via the optical system 304. The image processing unit 1002 performs predetermined image processing and compression and coding processing on the signal acquired and photoelectrically converted by the imaging unit 1001 to generate image data.

The image processing unit 1002 may perform image processing via a dedicated processor included in the imaging apparatus 1000 or via the CPU 301. The system control unit 1003 analyzes a camera control command received from the client apparatus 2000 and performs processing according to the command. For example, the system control unit 1003 instructs the image processing unit 1002 to perform image quality adjustment and instructs the lens control unit 1005 to perform zoom and focal control.

The drive control unit 1004 controls a motor which drives, for example, a focal lens and a zoom lens of the optical system 304. The drive control unit 1004 controls the motor which drives, for example, the focal lens and zoom lens of the optical system 304 in accordance with an instruction from the lens control unit 1005.

The lens control unit 1005 instructs the drive control unit 1004 to perform motor control based on an instruction transmitted from the system control unit 1003.

The video image management unit 1006 stores images, such as captured fisheye images, in the auxiliary storage device 303 and manages the images.

The communication control unit 1007 transmits image data, such as fisheye images captured by the imaging apparatus 1000, to the client apparatus 2000. The communication control unit 1007 receives a command, such as a camera control command transmitted from the client apparatus 2000, and transmits the command to the system control unit 1003. The communication control unit 1007 also transmits a response for the command to the client apparatus 2000.

FIG. 4B illustrates an example of a functional configuration of the client apparatus 2000.

The client apparatus 2000 includes a display control unit 2001, an input control unit 2002, a system control unit 2003, and a communication control unit 2004.

The display control unit 2001 outputs to an output apparatus connected to the output I/F 315 an image received from the imaging apparatus 1000 and/or a graphic user interface (GUI) for performing camera control. According to the present exemplary embodiment, the display control unit 2001 displays the image received from the imaging apparatus 1000 and the GUI for performing camera control to a liquid crystal display apparatus as an output apparatus connected to the output I/F 315.

The input control unit 2002 receives information input by a user of the client apparatus 2000 via an input apparatus connected to the input I/F 314. The user operates, for example, the GUI displayed on the output unit via the input apparatus.

The system control unit 2003 generates a camera control command in response to a user's GUI operation and transmits the command to the imaging apparatus 1000 via the communication control unit 2004. The system control unit 2003 instructs the display control unit 2001 to display the image data received from the imaging apparatus 1000, via the communication control unit 2004.

In this way, the client apparatus 2000 can acquire captured images from the imaging apparatus 1000 and perform various camera control on the imaging apparatus 1000 via the network 3000.

Figure 5:
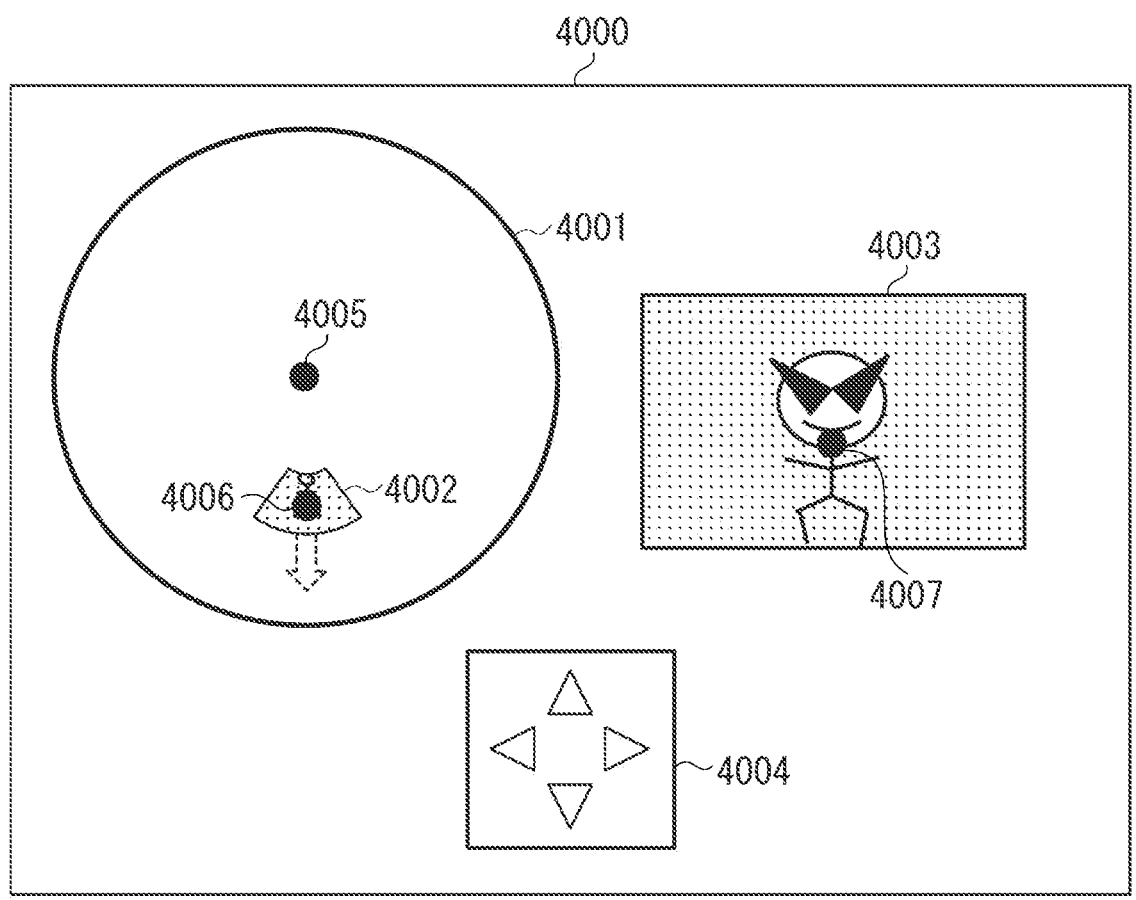
FIG. 5 illustrates an example of a graphical user interface (GUI).

FIG. 5 illustrates an example of a GUI output by the client apparatus 2000. A GUI 4000 includes a fisheye image display area 4001, a clipping portion specification frame 4002, a clipped image display area 4003, and a control button 4004. The system control unit 2003 instructs the display control unit 2001 to display the GUI 4000 and receives an input to the GUI displayed on the output unit, via an input apparatus connected to the input I/F 314.

In the fisheye image display area 4001, a fisheye image captured by the imaging apparatus 1000 is displayed. The clipping portion specification frame 4002 indicates a clipping portion in the fisheye image displayed on the fisheye image display area 4001. The clipping portion is clipped from the fisheye image. According to the present exemplary embodiment, the system control unit 1003 of the imaging apparatus 1000 stores information indicating where a clipping portion exists in the main storage device 302 and manages the information. The clipped image display area 4003 is an area for displaying an image obtained by a region specified in the clipping portion specification frame 4002 being clipped from the fisheye image and then dewarped. The control button 4004 is a button used to instruct the clipping portion specification frame 4002 to move.

The system control unit 2003 displays in the fisheye image display area 4001 the fisheye image captured by the imaging apparatus 1000 and received from the imaging apparatus 1000. The system control unit 2003 receives information indicating the position of the clipping portion from the imaging apparatus 1000, and displays the clipping portion specification frame 4002 at the position indicated by the received information. The system control unit 2003 displays in the image display area 4003 the image of the region indicated by the clipping portion specification frame 4002 clipped from the fisheye image and then dewarped. Based on an operation on the control button 4004, the system control unit 2003 issues an instruction for moving the clipping portion to the imaging apparatus 1000 to move the clipping portion specification frame 4002.

The system control unit 2003 outputs the GUI 4000 as a function of a control application for controlling the imaging apparatus 1000.

The function of the control application in the client apparatus 2000 according to the present exemplary embodiment will be described below with reference to FIG. 5.

When the control button 4004 detects a selection in the GUI 4000, the system control unit 2003 issues a command for moving the clipping portion specification frame 4002 in the direction indicated by the pressed key among the cross keys. The system control unit 2003 then transmits the issued command to the imaging apparatus 1000 via the communication control unit 2004.

The system control unit 2003 clips the position of the clipping portion specification frame 4002 from the imaging apparatus 1000 and receives the dewarped image via the communication control unit 2004. The system control unit 2003 then displays the received dewarped image of the clipped image in the clipped image display area 4003.

Figure 6:
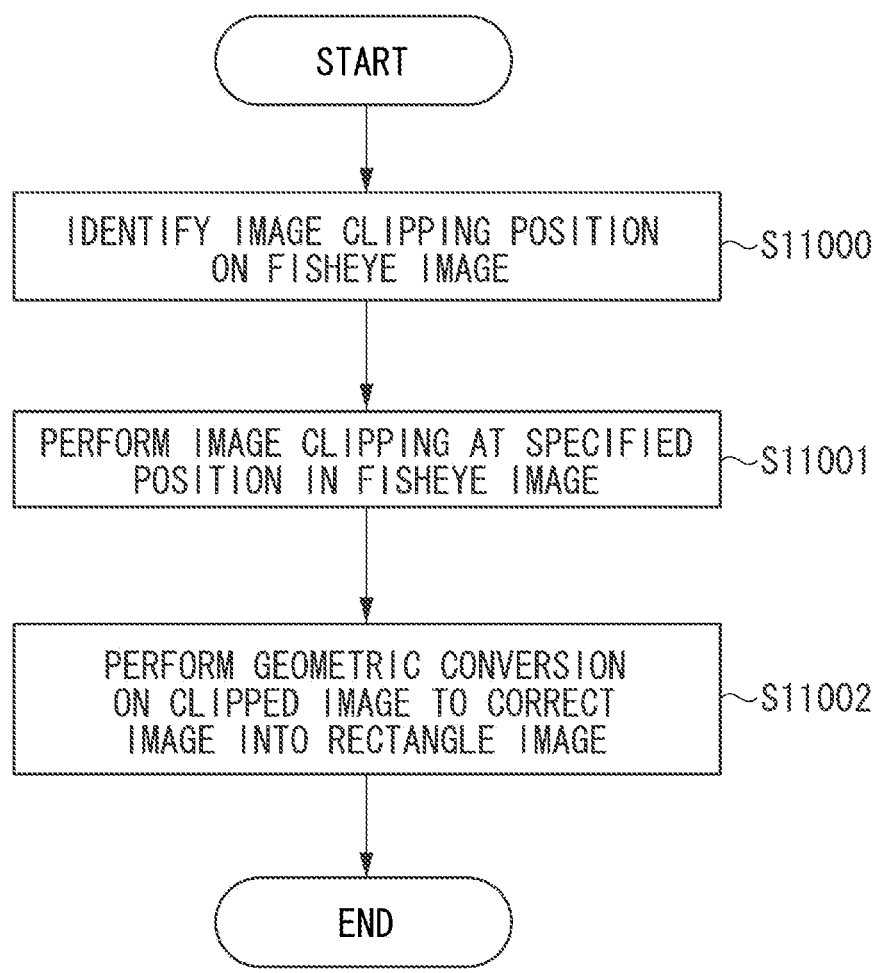
FIG. 6 is a flowchart illustrating an example of dewarp processing.

FIG. 6 is a flowchart illustrating an example of dewarp processing. An example of dewarp processing performed by the imaging apparatus 1000 will be described below with reference to FIG. 6.

In step S11000, the system control unit 1003 receives from the client apparatus 2000 information indicating that the control button 4004 has been selected and moves the clipping portion 4002 according to the received information. The system control unit 1003 then identifies the position of the clipping portion 4002 on the fisheye image captured by the imaging apparatus 1000. Thus, the system control unit 1003 also functions as a position determination unit (position determination means) for determining the position of the clipping portion 4002 in the fisheye image.

In step S11001, the system control unit 1003 performs image clipping on the region at the position of the clipping portion 4002 identified in step S11000 from the fisheye image captured by the imaging apparatus 1000.

In step S11002, the system control unit 1003 performs geometric conversion on the image clipped in step S11001 to correct the clipped image into a rectangle image. The system control unit 1003 then transmits, for example, information about the position of the clipping portion 4002 after the movement and the rectangle image as a correction result to the client apparatus 2000. The system control unit 2003 displays the clipping portion specification frame 4002 at the position indicated by the information about the position of the clipping portion 4002 after the movement received from the imaging apparatus 1000 to move the clipping portion specification frame 4002. The system control unit 2003 also displays in the clipped image display area 4003 the rectangle image as a correction result received from the imaging apparatus 1000.

Figure 7:
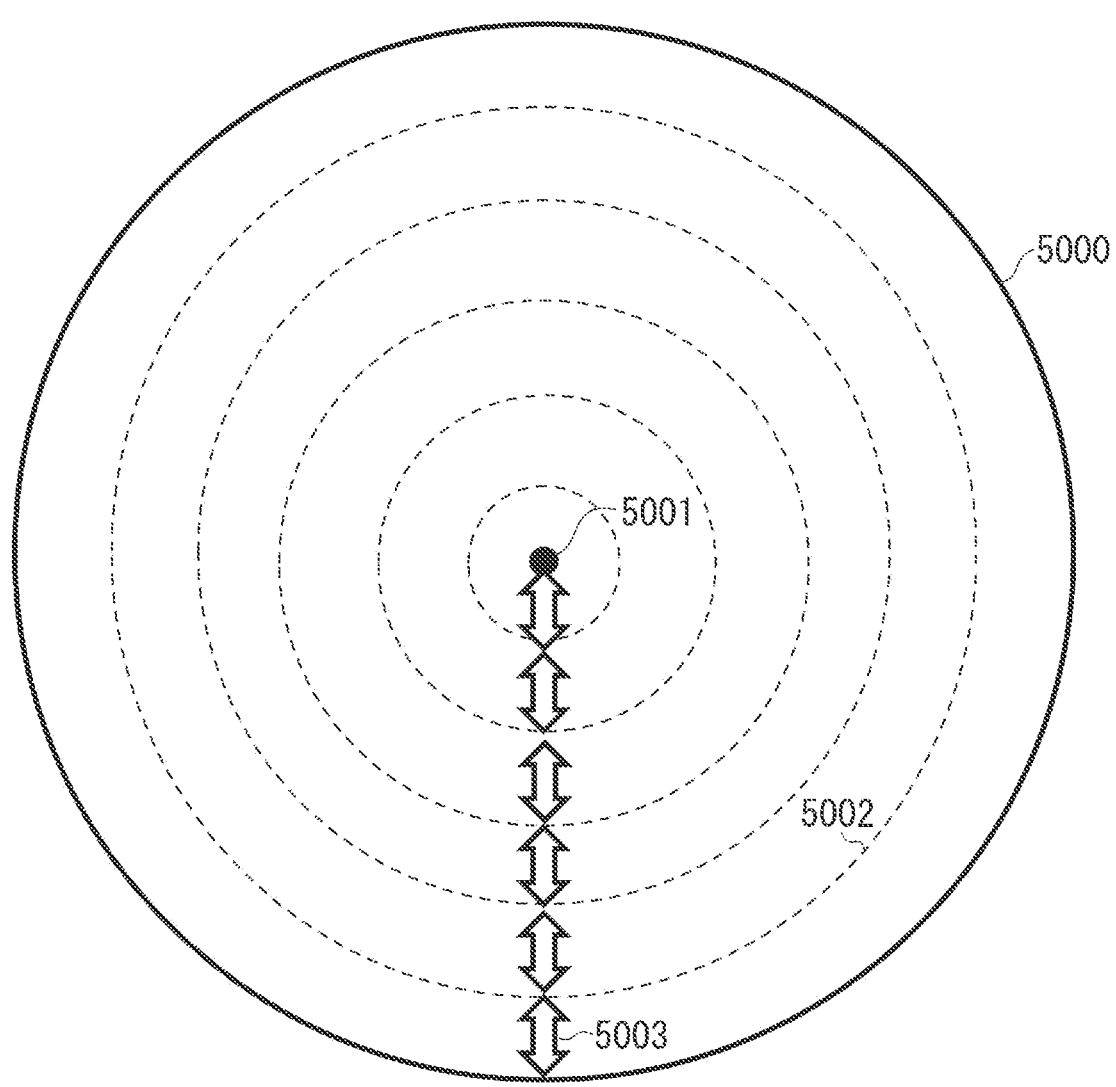
FIG. 7 illustrates an example movement of a clipping portion.

FIG. 7 illustrates an example movement of the clipping portion 4002 through direction specification.

FIG. 7 illustrates a fisheye image 5000 captured by the imaging apparatus 1000. A point 5001 is the central point of the fisheye image 5000. A dotted line 5002 indicates a line which connects positions where the central point 5001 of the clipping portion 4002 moves through the vertical movement. The dotted line 5002 has a circular shape centering on the central point 5001 of the fisheye image 5000. The central point 5001 of the clipping portion 4002 refers to a point corresponding to the central point 5001 of a rectangle image 4003 which is a dewarped region of the fisheye image 5000 corresponding to the clipping portion 4002. According to the present exemplary embodiment, the system control unit 1003 determines the moving amount of the clipping portion 4002 as the position of the clipping portion 4002, based on the coordinates of the center 5001 of the clipping portion 4002. Thus, the system control unit 1003 serves as a determination means configured to determine, based on the position of the clipping portion 4002 determined by the position determination means 1003, a moving amount of the clipping portion 4002 for moving the clipping portion 4002. An arrow 5003 indicates the moving amount of the clipping portion 4002 in one vertical movement (for example, the movement when the up or down button of the control button 4004 is selected once).

When the imaging apparatus 1000 is in the general-purpose mode, the system control unit 1003 makes constant the moving amount of the clipping portion 4002 in one movement regardless of the position of the clipping portion 4002, as illustrated in FIG. 7.

Figure 8:
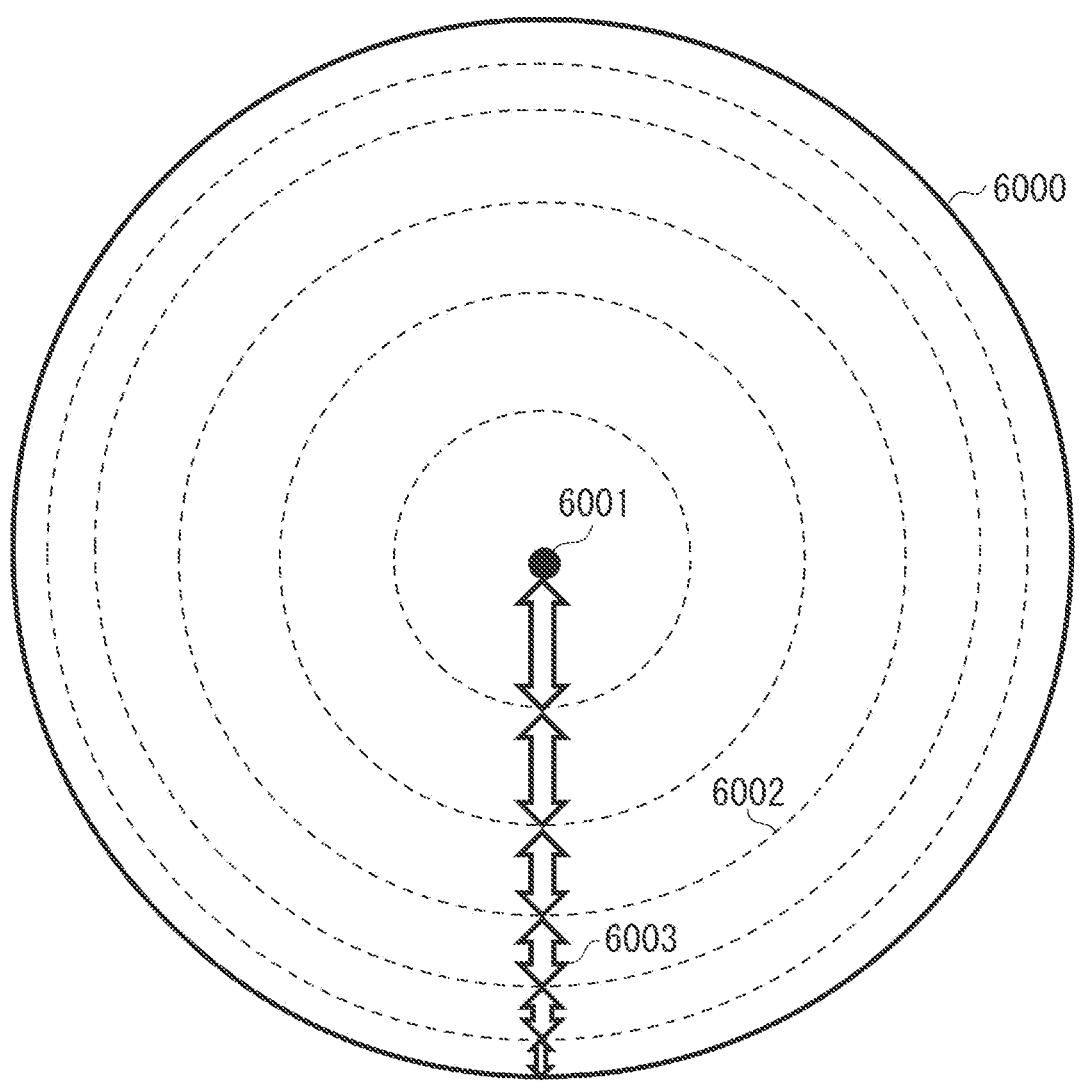
FIG. 8 illustrates another example movement of a clipping portion.

FIG. 8 illustrates an example of a movement of the clipping portion through direction specification.

FIG. 8 illustrates a fisheye image 6000 captured by the imaging apparatus 1000. A point 6001 is the central point of the fisheye image 6000. A dotted line 6002 indicates a line which connects positions where the central point 6001 of the clipping portion 4002 moves through the vertical movement. The dotted line 6002 has a circular shape centering on the central point 6001 of the fisheye image 6000. An arrow 6003 indicates the moving amount of the clipping portion 4002 in one vertical movement. Referring to the example illustrated in FIG. 8, the moving amount of the clipping portion 4002 in one movement decreases (the length of the arrow 6003 decreases) with increasing distance of the position of the clipping portion 4002 from the point 6001.

When the imaging apparatus 1000 is in the ceiling installation/desktop installation mode, the system control unit 1003 decreases the moving amount of the clipping portion 4002 in one movement with increasing distance of the position of the clipping portion 4002 from the point 6001, as illustrated in FIG. 8. When the imaging apparatus 1000 is installed on a ceiling or desk, the vicinity of the circumference of the fisheye image 6000 captured by the imaging apparatus 1000 may include as a subject a distant object reflected comparatively small, compared with the vicinity of the center 6001. Thus, in a case where the imaging apparatus 1000 is in the ceiling installation/desktop installation mode, the system control unit 1003 is able to more accurately adjust the position of the clipping portion 4002 existing near the circumference by decreasing the moving amount near the circumference of the fisheye image 6000 captured by the imaging apparatus 1000.

Figure 9:
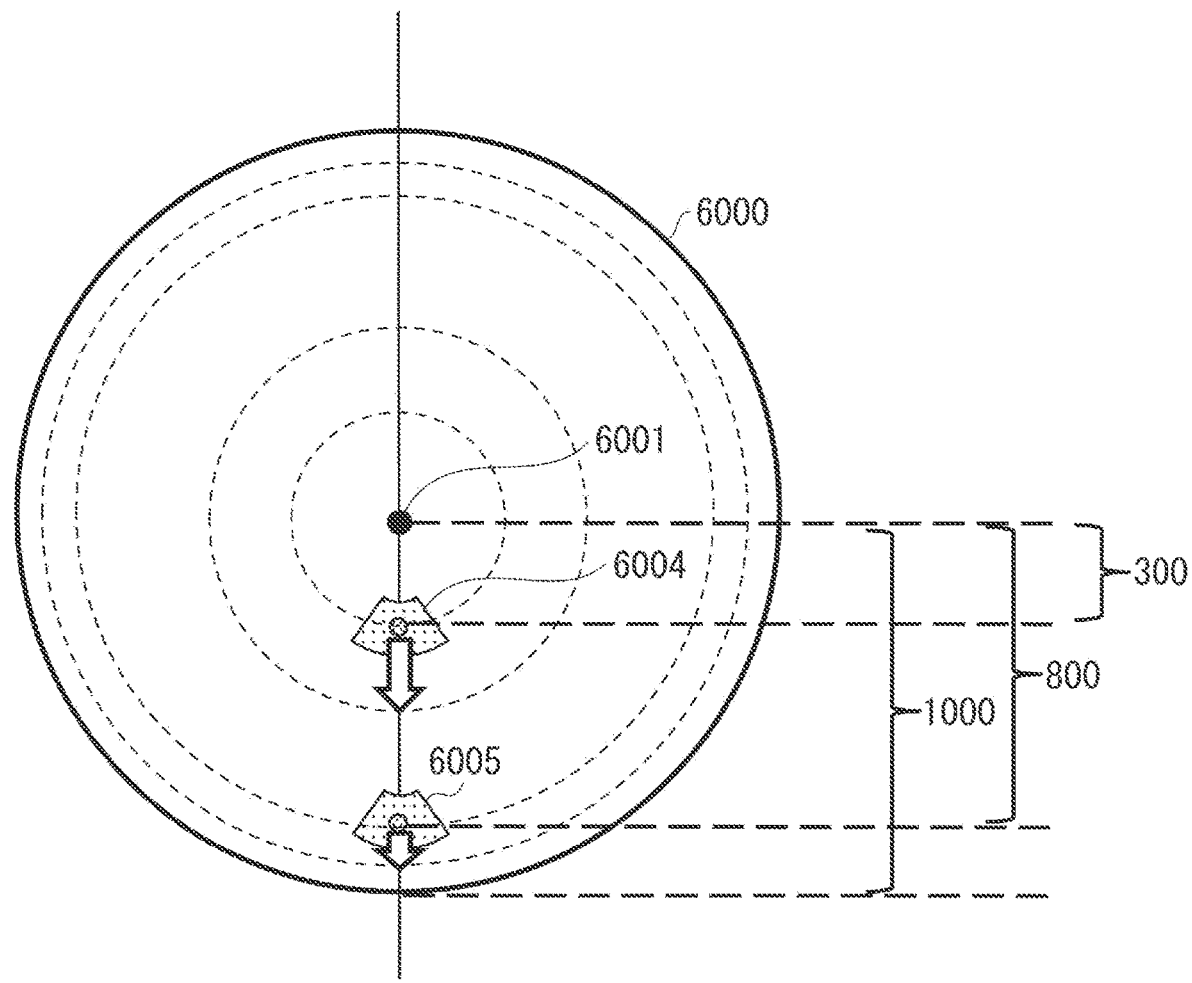
FIG. 9 illustrates an example of a method for determining a moving amount.

FIG. 9 illustrates an example of a method for determining the moving amount of the clipping portion 4002. An example of a method for determining the moving amount of the clipping portion 4002 within the fisheye image 6000 captured by the imaging apparatus 1000 in the ceiling installation/desktop installation mode will be described below with reference to FIG. 9.

The system control unit 1003 determines the moving amount of the clipping portion 4002 in one movement within the fisheye image 6000, for example, by using the following formula 1.

Moving amount=Basic moving amount[in pixels/one moving instruction]*Coordinate weighting factor (Formula 1)

Referring to the formula 1, the basic moving amount refers to the moving amount in the movement of the clipping portion 4002 in response to one moving instruction in a case where the imaging apparatus 1000 is in the general-purpose mode. The basic moving amount is a predetermined value. The auxiliary storage device 303 prestores information about the basic moving amount. Referring to the formula 1, the coordinate weighting factor is a parameter determined for respective coordinates of the fisheye image 6000, and is determined based on the distance between the coordinates and the center coordinates 6001 of the fisheye image 6000. For example, the coordinate weighting factor is determined based on the relation between the coordinates, the center coordinates 6001 of the fisheye image 6000, and the radius of the fisheye image 6000.

The system control unit 1003 determines the coordinate weighting factor, for example, by using the following formula 2:

coordinate weighting factor=radius of fisheye image [in pixels]/(($k$−1)*distance from center coordinates 6001 of fisheye image [in pixels]+radius of fisheye image [in pixels]) (Formula 2)

Referring to the formula 2, a constant k indicates that the moving amount of the clipping portion 4002 existing in the circumference of the fisheye image is 1/k times the moving amount of the clipping portion 4002 existing at the center 6001 of the fisheye image 6000. The auxiliary storage device 303 prestores the information about the constant k. The system control unit 1003 may also determine the coordinate weighting factor by using the following formula 3:

coordinate weighting factor=((radius of fisheye image[in pixels]*$k$)−distance from center coordinates 6001 of fisheye image [in pixels])/(radius of fisheye image [in pixels]*$k$) (Formula 3)

Referring to the example illustrated in FIG. 9, the system control unit 1003 determines the moving amount of the clipping portion 4002 in a case where the coordinates of the center 4006 of the clipping portion 4002 exist in coordinates 6004 and 6005, in the following way. The center 4006 of the clipping portion 4002 corresponds to the center 4007 of the clipped image display area 4003. Referring to the example illustrated in FIG. 9, k=2, Basic moving amount [in pixels/one moving instruction]=100, and Radius of fisheye image [in pixels]=1000 are assumed.

The system control unit 1003 determines the moving amount of the clipping portion 4002 in one movement in a case where the center 4006 of the clipping portion 4002 exists at the center 6001 of the fisheye image 6000 by using the formulas 1 and 2, for example, through the following calculation:

moving amount in center coordinates=100*(1000/ ((2−1)*0+1000))=100

More specifically, in a case where the center 4006 of the clipping portion 4002 exists at the center 4005 of the fisheye image 6000, the system control unit 1003 moves the clipping portion 4002 by 100 pixels in response to one movement. The system control unit 1003 also determines the moving amount of the clipping portion 4002 in one movement when the center 4006 of the clipping portion 4002 exists in the circumference of the fisheye image 6000 by using the formulas 1 and 2, for example, through the following calculation:

moving amount in circumference coordinates=100* (1000/((2−1)*1000+1000))=50

In other words, when the center 4006 of the clipping portion 4002 exists in the circumference of the fisheye image 6000, the system control unit 1003 moves the clipping portion by 50 pixels in response to one movement.

The system control unit 1003 also determines the moving amount of the clipping portion 4002 in one movement when the center 4006 of the clipping portion 4002 exists in the coordinates 6004 by using the formulas 1 and 2, for example, through the following calculation:

moving amount in coordinates 6004=100*(1000/((2−1)*300+1000))≈77

In other words, in a case where the center 4006 of the clipping portion 4002 exists in the coordinates 6004, the system control unit 1003 moves the clipping portion by 77 pixels in response to one movement.

The system control unit 1003 also determines the moving amount of the clipping portion 4002 in one movement when the center 4006 of the clipping portion 4002 exists in the coordinates 6005 by using the formulas 1 and 2, for example, through the following calculation:

moving amount in coordinates 6005=100*(1000/((2−1)*800+1000))≈56

More specifically, when the center 4006 of the clipping portion 4002 exists in the coordinates 6005, the system control unit 1003 moves the clipping portion by 56 pixels in response to one movement.

Figure 10:
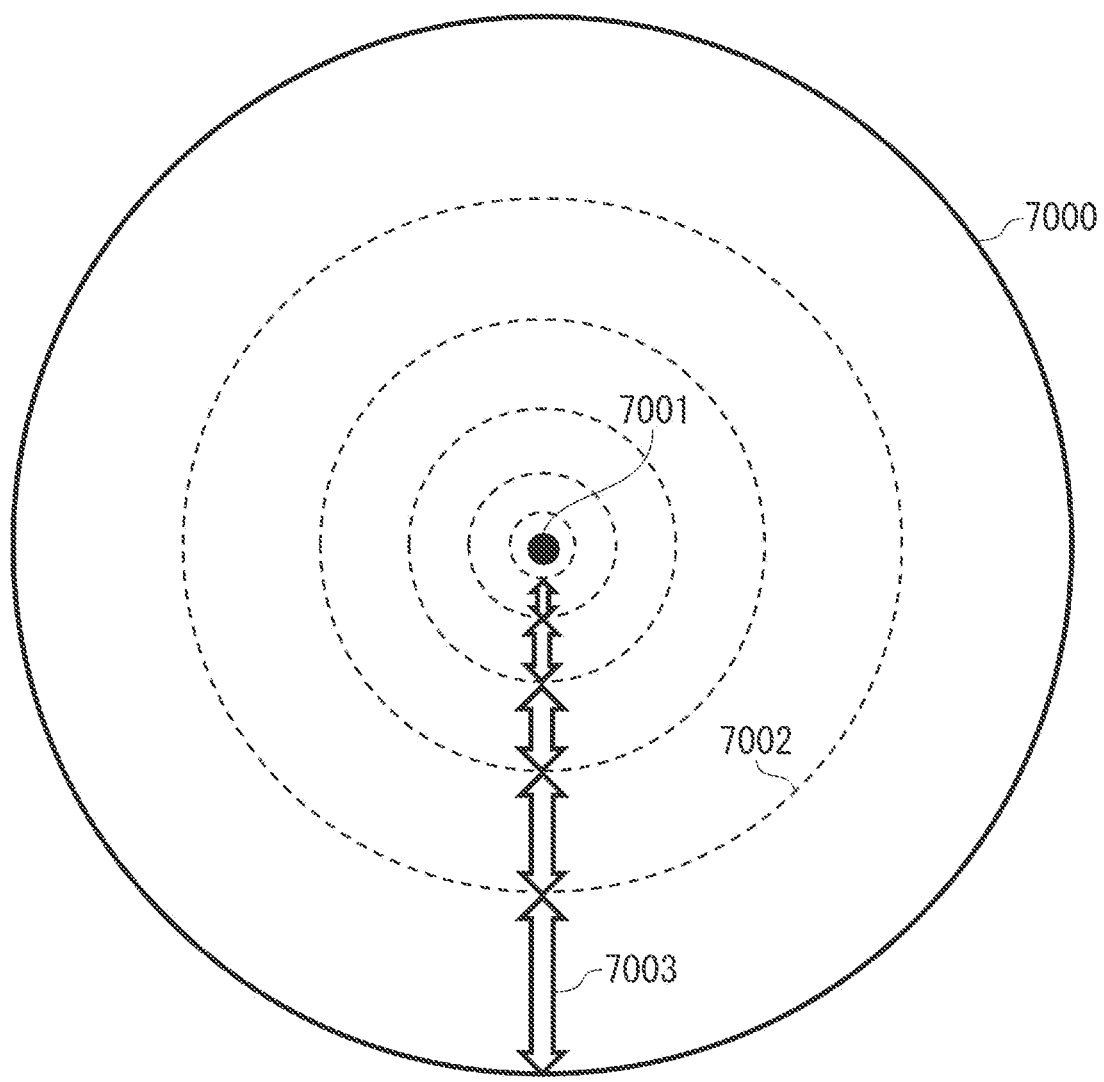
FIG. 10 illustrates a still another example movement of a clipping portion.

The system control unit 1003 determines the moving amount of the clipping portion 4002 so that the position of the clipping portion 4002 decreases with increasing distance of the position of the clipping portion 4002 from the center 6001 of the fisheye image 6000, by using the formulas 1 and 2. However, the system control unit 1003 may determine the moving amount of the clipping portion 4002 so that the position of the clipping portion 4002 decreases with increasing distance of the position of the clipping portion 4002 from the center 6001 of the fisheye image 6000, by using a formula other than the formulas 1 and 2. The system control unit 1003 may determine the moving amount of the clipping portion 4002, for example, by using the following formula:

moving amount=(predetermined constant)/(distance from center coordinates 6001 of fisheye image)$^2$ FIG. 10 illustrates an example movement of a clipping portion.

FIG. 10 illustrates a fisheye image 7000 captured by the imaging apparatus 1000. A point 7001 is the central point of the fisheye image 7000. A dotted line 7002 indicates a line which connects positions where the central point 7001 of the clipping portion moves through the vertical movement of the clipping portion. The dotted line 7002 has a circular shape centering on the central point 7001 of the fisheye image 7000. An arrow 7003 indicates the moving amount of the clipping portion in one vertical movement. Referring to the example illustrated in FIG. 10, the moving amount of the clipping portion in one movement increases (the length of the arrow 7003 increases) with increasing distance of the position of the clipping portion from the point 7001.

In a case where the imaging apparatus 1000 is in the wall attachment installation mode, the system control unit 1003 increases the moving amount of the clipping portion in one movement with increasing distance of the position of the clipping portion from the point 7001, as illustrated in FIG. 10. In a case where the imaging apparatus 1000 is installed on a wall, the vicinity of the center 7001 of the fisheye image 7000 captured by the imaging apparatus 1000 may include as a subject a distant object reflected comparatively small, compared with the vicinity of the circumference. Thus, in a case where the imaging apparatus 1000 is in the wall attachment installation mode, the system control unit 1003 is able to more accurately adjust the position of the clipping portion existing in the vicinity of the center 7001 by decreasing the moving amount of the vicinity of the center 7001 of the fisheye image 7000 captured by the imaging apparatus 1000.

Figure 11:
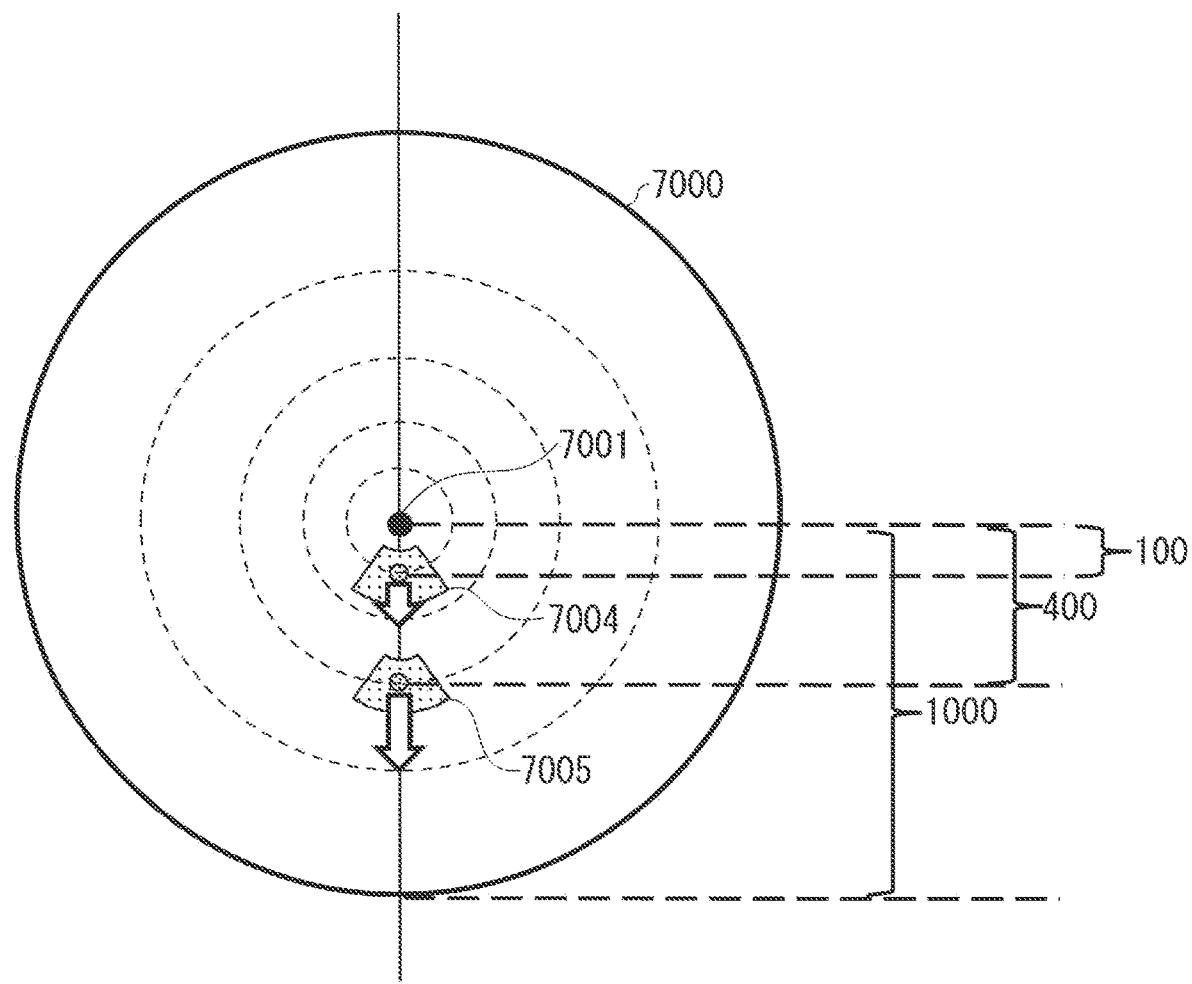
FIG. 11 illustrates another example of a method for determining a moving amount.

FIG. 11 illustrates an example of a method for determining the moving amount of a clipping portion. An example of a method for determining the moving amount of a clipping portion within a fisheye image 7000 captured by the imaging apparatus 1000 in the wall attachment installation mode will be described below with reference to FIG. 11.

The system control unit 1003 determines the moving amount of the clipping portion in one movement within the fisheye image 7000, for example, by using the formula 1. However, the system control unit 1003 uses a different value from the value described above with reference to FIG. 9 as the value of the coordinate weighting factor. The coordinate weighting factor in this case is a parameter determined for respective coordinates of the fisheye image 7000, and is determined based on the distance between the coordinates and the center coordinates 7001 of the fisheye image 7000. For example, the coordinate weighting factor is determined based on the relation between the coordinates, the center coordinates 7001 of the fisheye image 7000, and the radius of the fisheye image 7000.

The system control unit 1003 determines the coordinate weighting factor to be used in the formula 1, by using the following formula 4 (described below). Referring to the formula 3, a constant k indicates that the moving amount of the clipping portion existing at the center 7001 of the fisheye image is 1/k times the moving amount of the clipping portion existing in the circumference of the fisheye image 7000.

Coordinate weighting factor=radius of fisheye image [in pixels]/((1−k)*distance from center coordinates 7001 of fisheye image [in pixels]+ k*radius of fisheye image [in pixels])    (Formula 4)

The system control unit 1003 may also determine the coordinate weighting factor by using the following formula 5:

coordinate weighting factor=(radius of fisheye image [in pixels]+distance from center coordinates 7001 of fisheye image [in pixels])/(radius of fisheye image [in pixels]*k)    (Formula 5)

Referring to the example illustrated in FIG. 11, the system control unit 1003 determines the moving amount of the clipping portion in a case where the coordinates of the center of the clipping portion exist in coordinates 7004 and 7005, in the following way. Referring to the example illustrated in FIG. 11, k=2, basic moving amount [in pixels/one moving instruction]=100, and radius of fisheye image [in pixels] =1000 are assumed.

The system control unit 1003 determines the moving amount of the clipping portion in one movement in a case where the center of the clipping portion exists in the circumference of the fisheye image 7000 by using the formulas 1 and 4, for example, through the following calculation:

moving amount in circumference coordinates=100* (1000/((1−2)*1000+2*1000)=100

In other words, in a case where the center of the clipping portion exists in the circumference of the fisheye image 7000, the system control unit 1003 moves the clipping portion by 100 pixels in response to one movement.

The system control unit 1003 determines the moving amount of the clipping portion in one movement in a case where the center of the clipping portion exists at the center 7001 of the fisheye image 7000 by using the formulas 1 and 4, for example, through the following calculation:

$$\text{moving amount in center coordinates} = 100*(1000/((1-2)*0+2*1000)) = 50$$

In other words, in a case where the center of the clipping portion exists at the center 7001 of the fisheye image 7000, the system control unit 1003 moves the clipping portion by 50 pixels in response to one movement.

The system control unit 1003 also determines the moving amount of the clipping portion in one movement in a case where the center of the clipping portion exists in the coordinates 7004 by using the formulas 1 and 4, for example, through the following calculation:

$$\text{moving amount in coordinates } 7004 = 100*(1000/((1-2)*100+2*1000)) \approx 53$$

In other words, in a case where the center of the clipping portion exists in the coordinates 7004, the system control unit 1003 moves the clipping portion by 53 pixels in response to one movement.

The system control unit 1003 also determines the moving amount of the clipping portion in one movement in a case where the center of the clipping portion exists in the coordinates 7005 by using the formulas 1 and 4, for example, through the following calculation:

$$\text{moving amount in coordinates } 6005 = 100*(1000/((1-2)*400+2*1000)) \approx 63$$

In other words, in a case where the center of the clipping portion exists in the coordinates 7005, the system control unit 1003 moves the clipping portion by 63 pixels in response to one movement.

The system control unit 1003 determines the moving amount of the clipping portion so that the position of the clipping portion increases with increasing distance of the position of the clipping portion from the center 7001 of the fisheye image 7000, by using the formulas 1 and 4. However, the system control unit 1003 may determine the moving amount of the clipping portion so that the position of the clipping portion increases with increasing distance of the position of the clipping portion from the center 7001 of the fisheye image 7000, by using a formula other than the formulas 1 and 4. The system control unit 1003 may determine the moving amount of the clipping portion, for example, by using the following formula:

$$\text{moving amount} = (\text{predetermined constant})/(\text{radius of fisheye image} - \text{distance from center coordinates of fisheye image})^2$$

Figure 12:
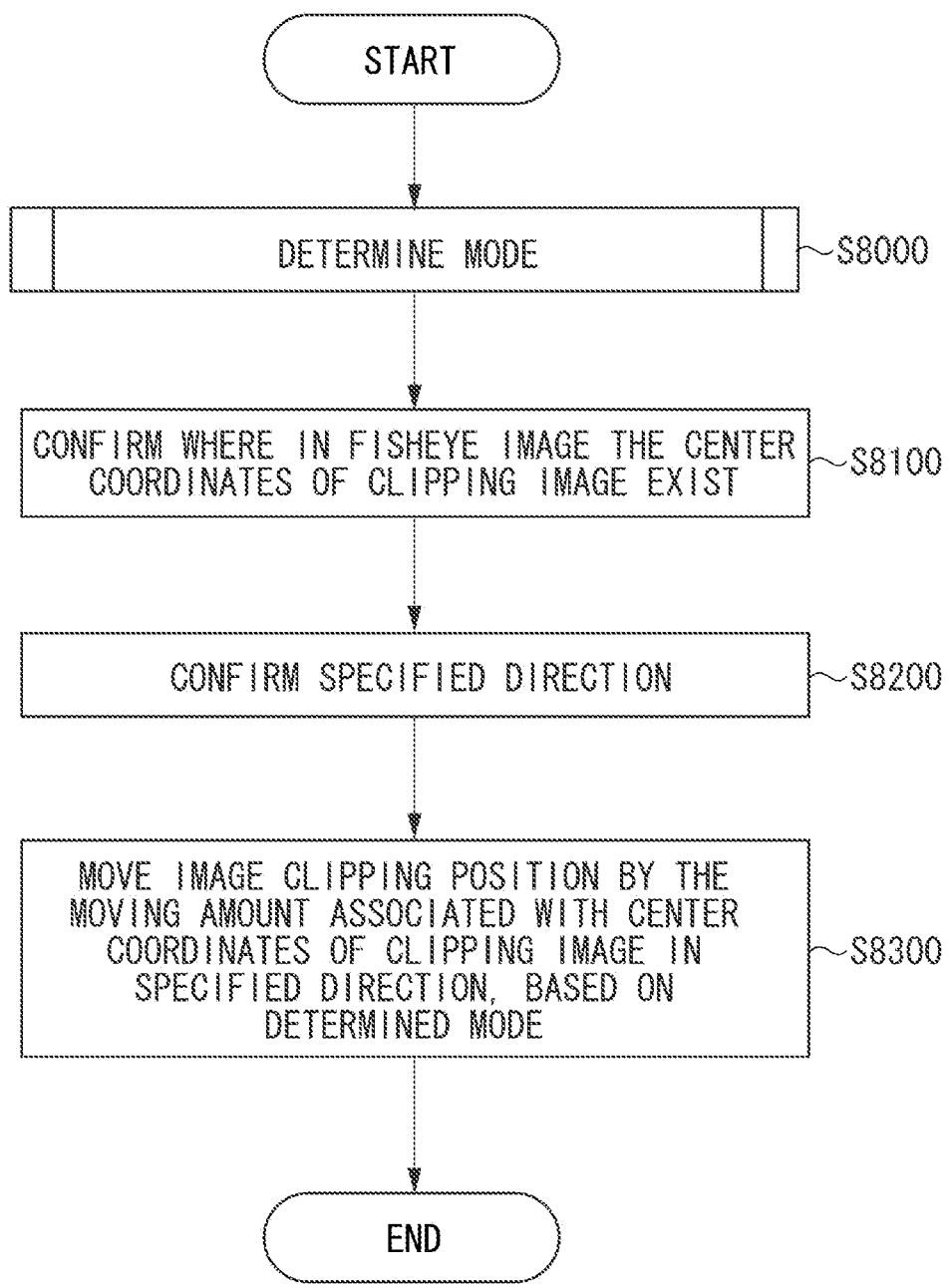
FIG. 12 is a flowchart illustrating an example of processing for moving a clipping portion.

FIG. 12 is a flowchart illustrating an example of processing for moving a clipping portion.

In step S8000, the system control unit 1003 determines the mode of the imaging apparatus 1000 based on installation conditions and operations on the imaging apparatus 1000.

In step S8100, the system control unit 1003 identifies in which coordinates of the fisheye image captured by the imaging apparatus 1000 the coordinates of the center of the clipping portion exist, based on the information about the clipping portion stored in the main storage device 302.

In step S8200, the system control unit 1003 receives from the client apparatus 2000 an instruction to move the clipping portion, for example, based on an operation on the control button 4004 of the GUI 4000. The system control unit 1003 then identifies the moving direction indicated by the received moving instruction.

In step S8300, the system control unit 1003 determines the moving amount of the clipping portion based on the mode determined in step S8000 and the coordinates of the center of the clipping portion identified in step S8100. The system control unit 1003 determines the moving amount of the clipping portion, for example, based on the method described above with reference to FIGS. 9 and 11. The system control unit 1003 then moves the clipping portion by the determined moving amount in the direction identified in step S8200, and stores information about the position of the clipping portion after the movement in the main storage device 302.

Figure 13:
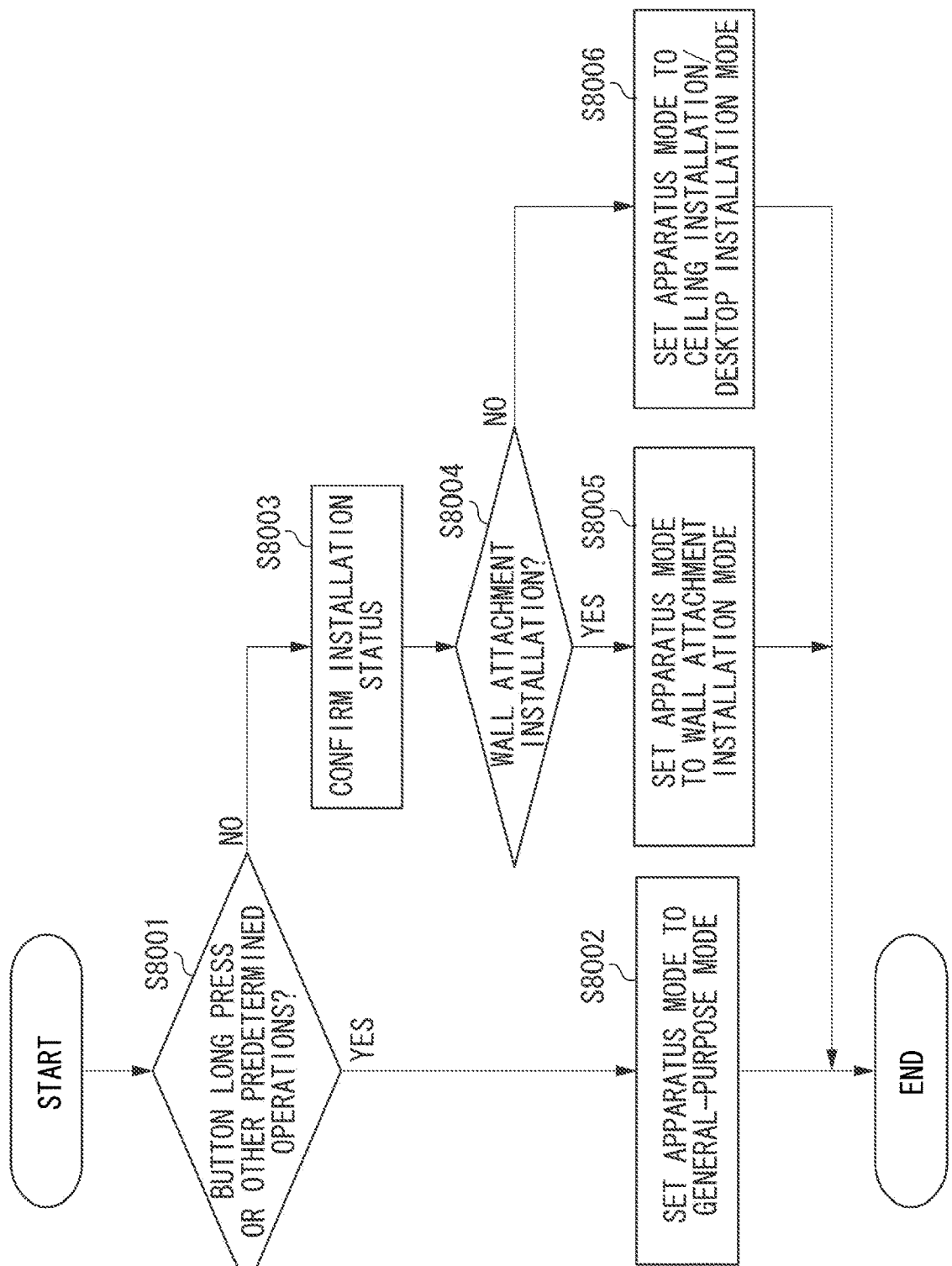
FIG. 13 is a flowchart illustrating an example of mode determination processing.

FIG. 13 is a flowchart illustrating an example of processing for determining the mode of the imaging apparatus 1000. The processing of step S8000 will be described in detail below with reference to FIG. 13.

In step S8001, the system control unit 1003 determines whether an operation performed on the control button 4004 on the client apparatus 2000 by the user is one of predetermined operations (including a long button press, repetitive button press, and other continuous operations). If the system control unit 1003 determines that the operation performed on the control button 4004 on the client apparatus 2000 by the user is a predetermined operation (YES in step S8001), the processing proceeds to step S8002. On the other hand, if the system control unit 1003 determines that the operation performed on the control button 4004 on the client apparatus 2000 by the user is not a predetermined operation (NO in step S8001), the processing proceeds to step S8003. During a predetermined time period (e.g., for 3 seconds) after an operation is performed on the control button 4004, the system control unit 1003 may determine that the operation performed on the control button 4004 by the user is not a predetermined operation.

In step S8002, the system control unit 1003 determines that the mode of the imaging apparatus 1000 is the general-purpose mode described above with reference to FIGS. 2A and 7.

In step S8003, the system control unit 1003 confirms the setting state and installation status of the imaging apparatus 1000. The system control unit 1003 confirms the setting state and installation status, for example, based on the setting information about the imaging apparatus 1000 stored in the auxiliary storage device 303. The system control unit 1003 may confirm the installation status of the imaging apparatus 1000, for example, based on the signal of a sensor included in the imaging apparatus 1000. The system control unit 1003 may confirm the installation status of the imaging apparatus 1000, for example, based on an image captured by the imaging apparatus 1000. In step S8004, the system control unit 1003 determines whether the installation status of the imaging apparatus 1000 confirmed in step S8003 is wall attachment installation. If the system control unit 1003 determines that the installation status of the imaging apparatus 1000 confirmed in step S8003 is wall attachment installation (YES in step S8004), the processing proceeds to step S8005. On the other hand, if the system control unit 1003 determines that the installation status of the imaging apparatus 1000 confirmed in step S8003 is not wall attachment installation (NO in step S8004), the processing proceeds to step S8006.

In step S8005, the system control unit 1003 determines that the mode of the imaging apparatus 1000 is the wall attachment installation mode described above with reference to FIGS. 10 and 11.

In step S8006, the system control unit 1003 determines that the mode of the imaging apparatus 1000 is the ceiling installation/desktop installation mode described above with reference to FIGS. 8 and 9.

According to the present exemplary embodiment, the imaging apparatus 1000 identifies the coordinates of the center of a clipping portion from a fisheye image as the position of the clipping portion, and determines the moving amount of the clipping portion in one movement based on the identified position. Thus, the imaging apparatus 1000 is able to determine a more suitable moving amount of a clipping portion in a fisheye image.

The imaging apparatus 1000 also determines the moving amount of the clipping portion according to the mode indicating the installation status of the imaging apparatus 1000. Thus, the imaging apparatus 1000 is able to determine a suitable moving amount of the clipping portion according to the installation status of the imaging apparatus 1000.

A second exemplary embodiment will be described in detail below. According to the first exemplary embodiment, the imaging apparatus 1000 determines the moving amount of a clipping portion in one movement based on the position of the clipping portion in a fisheye image. According to the present exemplary embodiment, the imaging apparatus 1000 determines the moving amount of the clipping portion in one movement based on the angle of view of the clipping portion in addition to the position of the clipping portion in the fisheye image.

The system configuration of an information processing system according to the present exemplary embodiment is similar to that according to the first exemplary embodiment. The hardware configuration and functional configuration of the imaging apparatus 1000 according to the present exemplary embodiment are also similar to those according to the first exemplary embodiment. The hardware configuration and functional configuration of the client apparatus 2000 according to the present exemplary embodiment are also similar to those according to the first exemplary embodiment.

Figure 14:
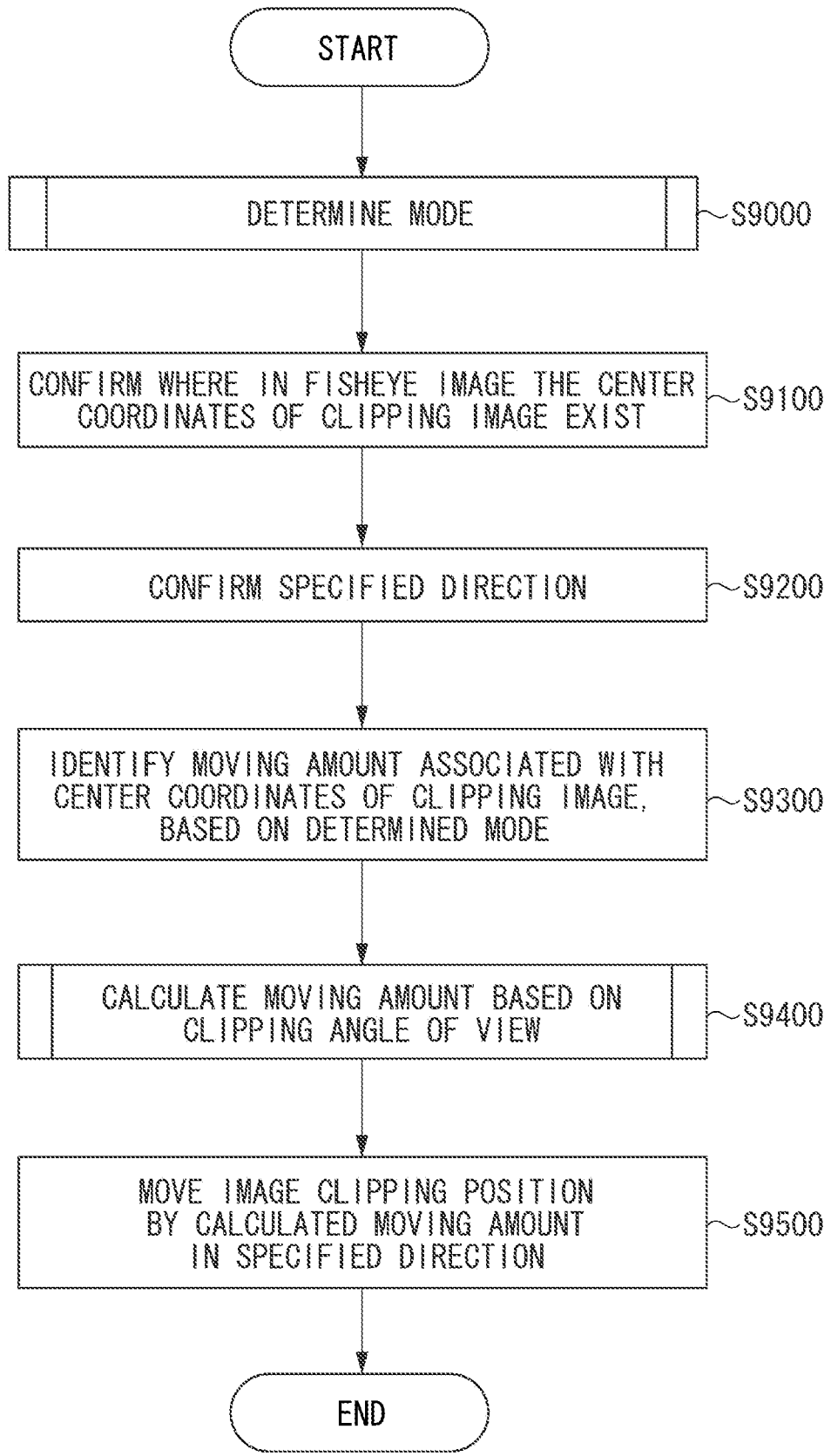
FIG. 14 is a flowchart illustrating another example of processing for moving a clipping portion.

FIG. 14 is a flowchart illustrating an example of processing for moving a clipping portion.

Processing in steps S9000 to S9200 is similar to the processing in steps S8000 to S8200 illustrated in FIG. 13, respectively.

In step S9300, the system control unit 1003 determines the moving amount of a clipping portion based on a mode determined in step S9000 and the coordinates of the center of the clipping portion identified in step S9100, and identifies the determined moving amount as a temporary moving amount. The system control unit 1003 determines the moving amount of the clipping portion, for example, based on the method described above with reference to FIGS. 9 and 11.

In step S9400, the system control unit 1003 determines the moving amount of the clipping portion in one movement based on the temporary moving amount identified in step S9300 and the angle of view of the clipping portion (the size of the clipping portion). The angle of view of the clipping portion is, for example, the region of the clipping portion and the horizontal width of the region of the dewarped clipping portion.

The system control unit 1003 determines the moving amount of the clipping portion by using the following formula 6, for example, based on the temporary moving amount and the angle of view of the clipping portion.

Moving amount=temporary moving amount*(angle of view of clipping portion/maximum angle of view settable as a clipping portion)  (Formula 6)

The system control unit 1003 may use other formulas, for example, in a case where the moving amount is decreased with decreasing angle of view of the clipping portion.

In step S9500, the system control unit 1003 moves the clipping portion by the moving amount determined in step S9400 in the direction identified in step S9200.

According to the present exemplary embodiment, as described above, the imaging apparatus 1000 determines the moving amount of the clipping portion in one movement based on the angle of view of the clipping portion in addition to the position of the clipping portion. Accordingly, the imaging apparatus 1000 is able to determine a moving amount suitable for the angle of view of the clipping portion.

A third exemplary embodiment will be described in detail below. According to the first and the second exemplary embodiments, the imaging apparatus 1000 determines the moving amount of a clipping portion in one movement. According to the present exemplary embodiment, the client apparatus 2000 determines the moving amount of a clipping portion in one movement. More specifically, the client apparatus 2000 will perform processing corresponding to the flowcharts illustrated in FIGS. 12 and 14.

The system configuration of the information processing system according to the present exemplary embodiment is similar to that according to the first exemplary embodiment. The hardware configuration and functional configuration of the imaging apparatus 1000 according to the present exemplary embodiment are also similar to those according to the first exemplary embodiment. The hardware configuration and functional configuration of the client apparatus 2000 according to the present exemplary embodiment are also similar to those according to the first exemplary embodiment.

According to the present exemplary embodiment, the system control unit 2003 determines the moving amount of a clipping portion in one movement in the following way. The system control unit 2003 identifies the position of the clipping portion in the fisheye image captured by the imaging apparatus 1000. The system control unit 2003 identifies the position of the clipping portion in the fisheye image, for example, by acquiring information about the clipping portion from the imaging apparatus 1000. The system control unit 2003 acquires information about the mode of the imaging apparatus 1000 from the imaging apparatus 1000.

The system control unit 2003 then determines the moving amount of the clipping portion in one movement by using the methods described above with reference to FIGS. 9 and 11 (methods using the formulas 1 and 2 and methods using the formulas 1 and 4) based on the acquired information about the mode and the position of the identified clipping portion. Then, when the control button 4004 is operated, the system control unit 2003 transmits information about the determined moving amount to the imaging apparatus 1000 to issue an instruction for moving the clipping portion.

According to the first and the second exemplary embodiments, the imaging apparatus 1000 manages information about a clipping portion and moves the clipping portion based on a determined moving amount. However, the client apparatus 2000 may manage the information about the clipping portion and moves the clipping portion. In such a case, the system control unit 2003 stores the information about the clipping portion in the main storage device 312 and manages the information. Upon detection of a selection operation by using the control button 4004 on the GUI 4000, the system control unit 2003 moves the clipping portion based on the detected operation. Then, the system control unit 2003 transmits the information about the clipping portion after the movement to the imaging apparatus 1000.

The imaging apparatus 1000 dewarps the region indicated by the transmitted information about the clipping portion and transmits the dewarped image to the client apparatus 2000. The system control unit 2003 displays the received dewarped image in the clipped image display area 4003. The system control unit 2003 may dewarp the region indicated by the information about the clipping portion after the movement.

Other Embodiments

The present invention can also be realized when a program for implementing at least one of the functions according to the above-described exemplary embodiments is supplied to a system or apparatus via a network or storage medium, and at least one processor in a computer of the system or apparatus reads and executes the program. The present invention can also be realized by a circuit (e.g., an application specific integrated circuit (ASIC)) for implementing at least one function.

For example, a part or whole of the above-described functional configurations of the imaging apparatus 1000 and the client apparatus 2000 may be implemented as hardware in the imaging apparatus 1000 and the client apparatus 2000, respectively.

According to the first to the third exemplary embodiments, a single information processing apparatus, such as the imaging apparatus 1000 and the client apparatus 2000, determines the moving amount of a clipping portion in one movement. However, a plurality of information processing apparatuses mutually and communicably connected via a network may determine the moving amount of a clipping portion in one movement. In such a case, the functions illustrated in FIGS. 2A and 2B and the processing illustrated in FIGS. 12 and 14 are implemented by CPUs of a plurality of the information processing apparatuses collaboratively performing processing based on programs stored in auxiliary storage devices of respective information processing apparatuses.

While the present invention has specifically been described in detail based on the above-described exemplary embodiments, the present invention is not limited thereto. The above-described exemplary embodiments may be optionally combined.

According to each of the above-described exemplary embodiments, it is possible to determine a more suitable moving amount of a clipping portion in a fisheye image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-121162, filed Jun. 21, 2017, which is hereby incorporated by reference herein in its entirety.

What is claimed is:

1. An information processing apparatus comprising a computer executing instructions that, when executed by the computer, cause the computer to function as:
   an accepting unit configured to accept an instruction to move a clipping position of a clipping region for clipping a clipped image from an image captured by using a fisheye lens;
   a position determination unit configured to determine an initial position of the clipping region in the captured image; and
   a determination unit configured to determine, based on where the initial position determined by the position determination unit is located in the captured image, a first moving amount of the initial position of the clipping region for moving the clipping position according to the instruction,
   wherein, in a case where an imaging apparatus configured to capture the captured image is installed on a ceiling and the initial position of the clipping region exists at a first position away from a predetermined position by a first distance, the determination unit determines the first moving amount of the initial position of the clipping region, so that the first moving amount is smaller than a second moving amount determined in a case where the clipping region exists at a second position away from the predetermined position in the captured image by a second distance shorter than the first distance.

2. The information processing apparatus according to claim 1, wherein the position determination unit determines a central position of the clipping region in the captured image as the initial position of the clipping region.

3. The information processing apparatus according to claim 1, wherein, based on a parameter related to the first moving amount of the initial position of the clipping region defined for coordinates of the initial position of the clipping region in the captured image determined by the position determination unit, the determination unit determines the first moving amount of the initial position of the clipping region when the instruction for moving the clipping position is issued.

4. The information processing apparatus according to claim 3, wherein a value of the parameter is defined according to a distance between a center of the captured image and the coordinates.

5. The information processing apparatus according to claim 1, wherein, based on the initial position of the clipping region determined by the position determination unit and an angle of view of the clipping region, the determination unit determines the first moving amount of the initial position of the clipping region when the instruction for moving the clipping position is issued.

6. The information processing apparatus according to claim 1, wherein, based on the initial position of the clipping region determined by the position determination unit and an installation status of the imaging apparatus which has captured the captured image, the determination unit determines the first moving amount of the initial position of the clipping region.

7. The information processing apparatus according to claim 1, wherein the instructions further cause the computer to function as a moving unit configured to, if the instruction for moving the clipping region is received, move the clipping position of the clipping region by the first moving amount of the initial position of the clipping region determined by the determination unit in a direction specified by the instruction.

8. The information processing apparatus according to claim 7, wherein the determination unit determines the first moving amount of the initial position of the clipping region corresponding to one instruction which is for moving the clipping position.

9. The information processing apparatus according to claim 1, wherein the information processing apparatus is the imaging apparatus configured to capture the captured image by using the fisheye lens.

10. The information processing apparatus according to claim 1, wherein the information processing apparatus is capable of communicating with the imaging apparatus configured to capture the captured image by using the fisheye lens.

11. The information processing apparatus according to claim 1, wherein the instructions further cause the computer to function as an output unit configured to output a clipped image corresponding to the clipping region.

12. The information processing apparatus according to claim 1, wherein the predetermined position is a central position of the captured image.

13. The information processing apparatus according to claim 1, wherein, in a case where the clipping region exists at the first position away from the predetermined position in the captured image by the first distance, the determination unit determines, as the first moving amount of the initial position of the clipping region, the new moving amount larger than the second moving amount in the case where the clipping region exists at the second position away from the predetermined position in the captured image by the second distance shorter than the first distance.

14. The information processing apparatus according to claim 13, wherein the predetermined position is a central position of the captured image.

15. The information processing apparatus according to claim 1, wherein, in a case where the imaging apparatus configured to capture the captured image is installed on a wall and the clipping region exists at the first position away from the predetermined position by the first distance, the determination unit determines the first moving amount of the initial position of the clipping region, so that the first moving amount is larger than the second moving amount determined in the case where the clipping region exists at the second position away from the predetermined position in the captured image by the second distance.

16. An information processing method performed by an information processing apparatus, the information processing method comprising:
   accepting an instruction to move a clipping position of a clipping region for clipping a clipped image from an image captured by using a fisheye lens;
   determining an initial position of the clipping region in the captured image; and
   determining, based on where the initial position is located in the captured image, a first moving amount of the initial position of the clipping region for moving the clipping position according to the instruction,
   wherein, in a case where an imaging apparatus configured to capture the captured image is installed on a ceiling and the initial position of the clipping region exists at a first position away from a predetermined position by a first distance, determining the first moving amount of the initial position of the clipping region, so that the first moving amount is smaller than a second moving amount determined in a case where the clipping region exists at a second position away from the predetermined position in the captured image by a second distance shorter than the first distance.

17. A non-transitory computer-readable recording medium storing a program for causing a computer to function as an information processing apparatus comprising:
   an accepting unit configured to accept an instruction to move a clipping position of a clipping region for clipping a clipped image from an image captured by using a fisheye lens;
   a position determination unit configured to determine an initial position of the clipping region in the captured image; and
   a determination unit configured to, based on where the initial position determined by the position determination unit is located in the captured image, determine a first moving amount of the initial position of the clipping region for moving the clipping position according to the instruction,
   wherein, in a case where an imaging apparatus configured to capture the captured image is installed on a ceiling and the initial position of the clipping region exists at a first position away from a predetermined position by a first distance, the determination unit determines the first moving amount of the initial position of the clipping region, so that the first moving amount is smaller than a second moving amount determined in a case where the clipping region exists at a second position away from the predetermined position in the captured image by a second distance shorter than the first distance.

* * * * *